United States Patent
Sager

[15] 3,657,033
[45] Apr. 18, 1972

[54] METHOD AND APPARATUS FOR CONTINUOUS CUTTING AND JOINING OF THERMOPLASTIC SHEET MATERIAL

[72] Inventor: Thomas B. Sager, Plymouth Valley, Pa.
[73] Assignee: Ultrasonic Systems, Inc., Farmingdale, N.Y.
[22] Filed: Mar. 26, 1969
[21] Appl. No.: 810,638

[52] U.S. Cl................................156/73, 156/580, 156/251, 156/515
[51] Int. Cl.......................................................B29c 27/08
[58] Field of Search............................156/73, 251, 515, 580

[56] References Cited

UNITED STATES PATENTS

| 3,378,429 | 4/1968 | Obeda | 156/515 |
| 3,401,446 | 9/1968 | Obeda et al. | 156/584 |
| 3,457,132 | 7/1969 | Tuma et al. | 156/515 |

*Primary Examiner*—Samuel Feinberg
*Attorney*—Sherman Levy

[57] ABSTRACT

A method and means for continuously cutting and sealing thin gauge thermoplastic sheet material using kinetic energy produced by a horn of reduced sealing area.

5 Claims, 7 Drawing Figures

PATENTED APR 18 1972    3,657,033
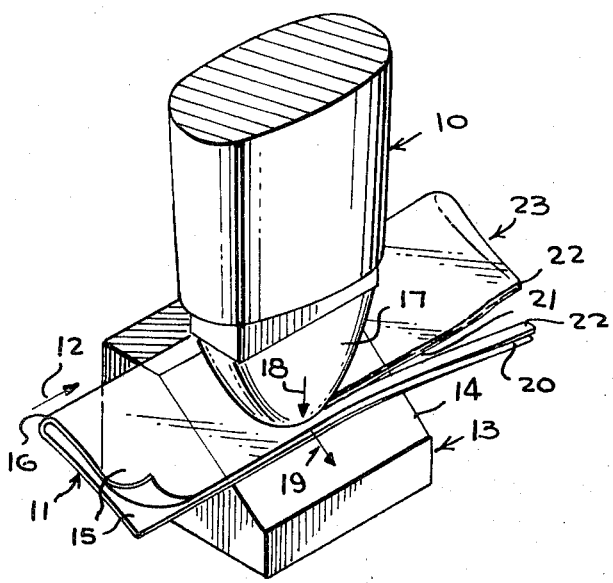
Fig-1
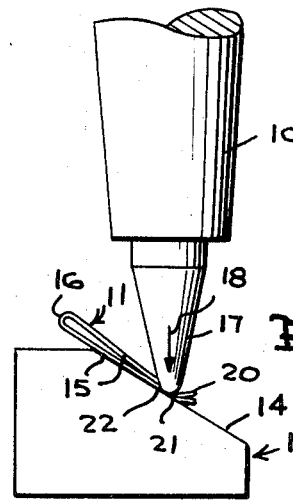
Fig-2
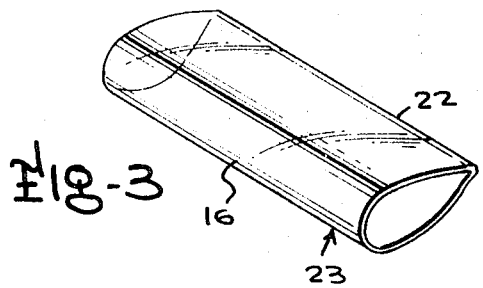
Fig-3
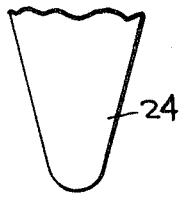 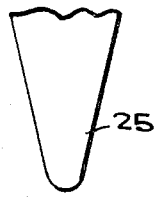 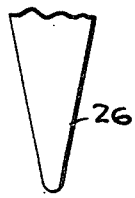 
Fig-4A    Fig-4B    Fig-4C    Fig-4D
INVENTOR
THOMAS B. SAGER
BY Sherman Levy
ATTORNEY

METHOD AND APPARATUS FOR CONTINUOUS CUTTING AND JOINING OF THERMOPLASTIC SHEET MATERIAL

The present invention relates to a horn to be used as part of a machine that will seal and cut thin thermoplastic on a continuous operating basis at speeds such as those that are suitable for packaging applications.

An object of the present invention is to provide an improved method and means for sealing and cutting thin thermoplastic or a continuous operating basis at suitable speeds, and wherein the special horn has many uses in manufacturing of products such as in sealing heat shrinkable materials of a thermoplastic type and creating a bond on a continuous basis that is either linear or non-linear without shrinking the film, and wherein the present invention also permits the horn to remain clean and free of plastic melt.

Another object is to provide a horn which has a new and original seal and cut tool, as well as a tool that is useful in packaging, and in addition there is provided a tool that is practical and because of its sealing rate it can be easily and readily applied to various types of packaging machines or equipment, the horn remaining clean and free of contamination at all times when sealing and cutting.

In addition, the resent invention does not allow noticeable shrinkage when bonding and cutting heat shrinkable films, and the device is easy to install on existing packaging machinery or equipment in areas where continuous sealing occurs or is needed.

Further objects and advantages are to provide improved elements and arrangements thereof in a device of the character described that is economical to produce, durable in form, and conducive to the most economical use of materials and uniformity of members formed therefrom.

Still further objects and advantages will become apparent from the subsequent description in the specification.

IN THE DRAWINGS:

FIG. 1 is a fragmentary perspective view of an ultrasonic horn and anvil illustrating the process of the present invention for cutting and sealing plastic.

FIG. 2 is a side elevational view of the device shown in FIG. 1;

FIG. 3 is a fragmentary perspective view of a plastic tube or member that has been cut and sealed in accordance with the present invention;

FIGS. 4A, 4B, 4C and 4D are fragmentary elevational views illustrating variations or modifications in the horn or blade configuration.

Referring in detail to the drawings, the numeral 10 indicates a horn that is part of a kinetic machine, and the horn is adapted to be used for sealing and cutting thin thermoplastic such as the thermoplastic 11 on a continuous operating basis. The arrow indicated by the numeral 12 in FIG. 1 indicates the direction of movement of the film.

As shown in the drawings, there is provided an anvil which is indicated by the numeral 13, and anvil 13 may have an inclined surface 14 for a purpose to be later described. The thermoplastic 11 may consist of folded sheets or sections 15 which are folded about the fold line 16. The numeral 17 indicates a seal and cut blade, and the numerals 18 and 19 indicate the combination impact and shear action respectively. The numeral 20 indicates a waste strip that is formed when using the present invention. THe numeral 21 indicates the area where the cut is made so that the waste strip 20 separates from the remaining portion of the thermoplastic. The adjacent edge of the plastic 11 is bonded or sealed by a molecular bond as at 22, and in addition, the waste strip will also have a corresponding molecular bond along the edge where it is severed from the remaining portion of the plastic.

In FIG. 3, the numeral 23 indicates a completed product or tube that is made when using the process and means of the present invention.

Referring now to FIGS. 4A, 4B, 4C and 4D, the numerals 24, 25, 26 and 27 indicate various different shapes or configurations or the blades showing various radii that can be used.

It will therefore be seen that in accordance with the present invention there has been provided a method of and means for sealing and cutting thin thermoplastic on a continuous operating basis and when using the present invention, thermoplastic film such as the film 11 may be folded over upon itself to form the two sections or sheets 15 and this plastic may be folded over upon itself along the crease line or fold line 16. The plastic 11 is adapted to be advanced by any suitable mechanism in the direction indicated by the arrow 12 in FIG. 1 so that for example the plastic 11 may move from left to right in FIG. 1.

With the horn 10 suitably actuated by or energized by transducer of an ultrasonic machine, it will be seen that with the blade 17 connected to the horn 10 the blade 17 will exert or provide a combination impact and shear action as indicated by the arrows 18 and 19 in FIG. 1. This will result in or cause a cut to be made along the line 21, and at the same time the plastic will be sealed along the edge or line 22 so that a finished product or tube 23 will be provided as shown in FIG. 3.

Instead of using the blade 17, as shown in FIGS. 1 and 2, blades of different radii or configuration may be used, and for example, FIGS. 4A, 4B, 4C and 4D indicate blades 24, 25, 26 and 27 which may be used if desired or required.

It is to be understood that the parts can be made in different shapes or sizes as needed or desired, and any suitable materials can be used for making the various elements or parts.

With further reference to the present invention using the kinetic energy horn to seal and cut thin plastic on a continuous operating basis, ultrasonic frequency in the range of about 20 kc's can be used to develop the seal, and it is to be understood that such kinetic energy includes mechanical vibrations at various frequency ranges of sonic and ultrasonic.

It will therefore be seen that there has been provided a horn which may be part of a predeveloped K.E. machine that will seal and cut thin thermoplastic on a continuous operating basis at speeds suitable by packaging companies and the like. The seal and cut horn is highly advantageous over previous or standard K.E. bonding horns and techniques for sealing thermo-sheet plastics, and for example, it has been found that the standard methods and sealing horns will not achieve a satisfactory seal in very thin thermoplastic films.

Thus, K.E. induced in the thin films will either pass through the plastic sheets and into the back-up anvil which acts as an energy sink not allowing required temperatures to achieve a molecular thermo bond. In addition, it is believed that the material, being thin in gauge, was not resilient enough to generate temperatures required for a molecular thermo bond, and the K.E. heat losses were carried off by the back-up anvil. In order to overcome these disadvantages, there has been provided the special horn for sealing that will generate enough K.E. losses in the thin films to effect or bring about a good molecular thermo bond.

In addition, by reducing the sealing area of the horn, and with the construction that permits the thermo film to pass under and in a direction that allows continuous even liquid flow of plastic that is being produced by the special horn, the sheets will fuse together in a linear or non-linear direction. In addition, in order to achieve this bond, it requires cutting the film, that is thinning the area of plastic under the sealing horn to cause complete severing and this allows maximum plastic flow to either side of the sealing horn to act as a filler to create a strong thermo molecular bond.

The horn of the present invention has many uses in manufacturing various products. For example, it is especially suitable or useful in sealing heat shrinkable materials of the thermoplastic type and creating a continuous bond, either linear or non-linear without shrinking the film, and also allows the horn to remain clean and free of plastic melt. Further, it provides that breakaway seals can be accomplished for packages requiring this type of seal, and control of breakaway strength can be accomplished by the type of thermoplastic sheet and the gauge of the thermoplastic sheet, and in addition the control of breakaway strength can be controlled by the amount of K.E. induced at a moment of time and this is related to the sealing rate and power (K.E.) available, or a combination of both.

Attention is directed to the fact that various mechanical systems can be used with this horn for the sealing and cutting operations, and the particular or specific machine is not of special concern for the purposes of this patent application, although the configuration of the horn is, and the function of the horn is of major importance.

Thus, it will be seen that there has been provided a horn that will solve many packaging problems that occur in the bonding of thin thermoplastic sheets into tubes and other geometric figures without causing such problems as the shrinkage of films, uncontrolled breakaway seals for flexible and non-flexible packages, and the like.

There has thus been provided a new and original seal and cut tool, a tool useful in packaging, and a tool that is practical because of its sealing rate, ease of application to packaging equipment, and in addition, due to the fact that the horn remains clean and free of contamination at all times when sealing and cutting. Further, it does not allow noticeable shrinkage when bonding and cutting heat shrinkable films. Also, the device is easy to install on most existing packaging equipment or machinery in areas where continuous sealing occurs or is utilized.

FIG. 3 illustrates an end product such as a tube as indicated by the numeral 23, which may have a hermetic seal. Various types of sheet plastics may be used, such as polypropylene, vinyls, and the like.

The sealing tip of the horn may vary in radius to assure proper flow of melted plastic which will produce the desirable bond strength needed for that particular product.

The seal and cut horn remains clean and free of plastic melt during the sealing operation because the sealing tip on the horn remains at room temperature, which is far lower than the melting point of the thermoplastic film being sealed and cut. This permits incompatibility to adhesive bonding between the sealing tip and the film.

The inclined plane designed in the anvil allows the sealing tip of the horn to produce forces in shear and impact. These two forces, when combined, will cut and seal thermoplastic films. A higher percentage of shear force will reduce material wear between the horn tip and the anvil in contact during sealing. Direct impact can cause the horn tip or anvil to deform and render it unusable for sealing.

In addition, the energy developed through this mass in motion, being the ultrasonic horn, prevents shrinkage in the sealed area. This is due to the fact that the horn is below the melting temperature of the plastic it contacts. Also, the area being sealed can be considered a locus of small melted points, these points being imparted at a rate of approximately 20,000 cycles per second. Thus, continuous welding occurs. There is no energy, in the form of heat, radiated other than the point which is directly contacted by the horn.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. A method of ultrasonically simultaneously sealing and cutting thin thermoplastic sheets on a continuous operating basis with the aid of a blade having a radius contacting edge, comprising the steps of:
   A. providing an anvil having an inclined surface,
   B. overlapping said sheets in contact with each other on said inclined surface,
   C. positioning said blade such that said radius contacting edge applies a small compressive force to said sheets along a line traversing the area of overlap,
   D. moving said plastic sheets and said anvil and said blade relative to each other,
   E. vibrating the contacting edge of said blade at an ultrasonic rate to apply recurring force to said sheets with said recurring force having a combination of impact action by a substantial component perpendicular to said contacting edge and shear action having a substantial component parallel to said inclined surface of said anvil to generate sufficient kinetic energy at the area of contact with said blade to simultaneously cut and seal said sheets as they are moved relative to said blade.

2. The method as defined in claim 1, wherein in said moving step said plastic sheets are moved along said inclined surface relative to said blade.

3. The method as defined in claim 1, wherein in said moving step said anvil and said blade are moved relative to said plastic sheets.

4. Apparatus for ultrasonically simultaneously sealing and cutting thin thermoplastic sheets on a continuous operating basis comprising
   A. a blade having a radius contacting edge,
   B. an anvil having an inclined surface in spaced relation to said blade for a spacing therebetween to receive the everlapping sheets in contact with each other on said inclined surface and said radius contacting edge applying a small compressive force to said sheets along a line traversing the area of overlap as said plastic sheets move along said inclined surface relative to said blade, and
   C. means for vibrating the contacting edge of said blade at an ultrasonic rate to apply an additional recurring force to said sheets with said recurring force having a combination of impact action by a substantial component perpendicular to said contacting edge and shear action having a substantial component parallel to said inclined surface of said anvil to generate sufficient kinetic energy at the area of contact with said blade to simultaneously cut and seal said sheets as they are moved relative to said blade.

5. Apparatus as defined in claim 4, wherein said blade has a curvilinear tapered edge adapted to allow for the proper flow of melted plastic which produces the bonding strength necessary to form said seal.

* * * * *